Dec. 1, 1964 R. H. KOLB 3,159,723

CONTACTS FOR TELEMETERING SYSTEMS

Filed Oct. 12, 1961

53 56 61 59 54 58 55 57 20 60

52 51 50 16 15

26 27 30 25 31 29 21 28 10 24 22 23

INVENTOR:

R. H. KOLB

BY: Theodore E. Bieber

HIS ATTORNEY 3,159,723
Patented Dec. 1, 1964

3,159,723

CONTACTS FOR TELEMETERING SYSTEMS

Robert H. Kolb, Houston, Tex., assignor to Shell Oil Company, New York, N.Y., a corporation of Delaware Filed Oct. 12, 1961, Ser. No. 144,792
6 Claims. (Cl. 200—19)

This invention pertains to telemetering systems and more particularly to a novel set of contacts for use in a telemetering system in which a sweep contact rotates in a path that includes a movable and a reference contact.

In United States Patent Nos. 2,680,241 and 2,734,188, there are described telemetering systems in which a movable contact is displaced from a reference contact an angular amount equal to the magnitude of the information to be telemetered. A sweep contact is disposed to sweep a path that includes both the reference and movable contacts. Useful signals are transmitted when the sweep contact passes the reference contact and the movable contact in order that the angular displacement of the movable contact may be measured. While this type of telemetering system provides a simple means for telemetering information it is readily appreciated that the accuracy of the device depends mainly upon the accurate indication of when the sweep contact passes the reference and movable contacts.

In the prior art devices it has been suggested that magnetic pickups or capacitance type pickups could be used for the contacts. Both of these pickups have inherent errors caused by their inability to sharply define the contact points, particularly at low speeds. Thus, it is impossible to reproduce the same angular measurement for succeeding revolutions of the sweep contact.

Accordingly, it is the principal object of this invention to provide a novel set of contacts for a telemetering system in which a sweep contact traverses a path including a movable and reference contact.

A further object of this invention is to provide a unique construction for contacts used in a telemetering system in which the angular position between a movable and a reference contact may be accurately reproduced.

The above objects and advantages of this invention are achieved by providing a contact assembly for the movable and reference contacts that includes a retractable contact member that is spring biased to return to a fixed position. The fixed position is determined by biasing the retractable contact to force the end thereof into contact with the end of a bore or similar stop. In addition, the end of the contact provides a flat contact making surface. The sweep contact consists of a member having a substantially cylindrical contact making surface that insures a wiping action as it passes the movable and reference contacts. The use of sliding contacts that are spring biased to return to a fixed position insures that the movable and fixed contacts are always returned to their original positions. The use of a cylindrical contact making member, as for example, rod member, for the sweep contact, insures that the sweep contact will make essentialy line contact with the flat surface of the movable and reference contacts, thus insuring accurate reproduction of the angular position between the movable and reference contacts. The line contact insures high contact pressure while having less wear than a point contact.

The above objects and advantages of this invention will be more easily understood from the following detailed description of a preferred embodiment in which.

Figures 1, 2, 3, 4:
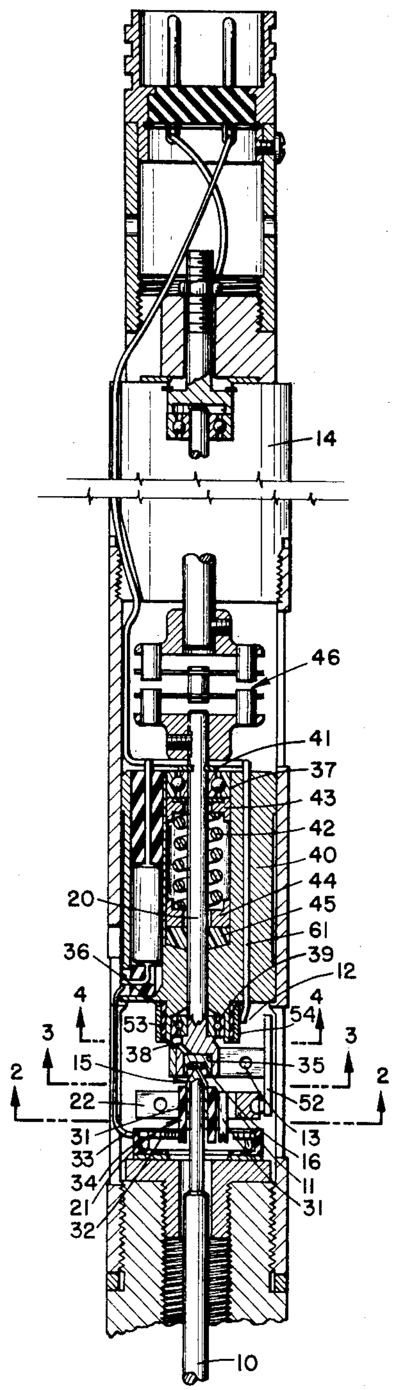
FIGURE 1 is a longitudinal cross section of a contact assembly constructed in accordance with this invention.
FIGURE 2 is a vertical section taken along the line 2—2 of FIGURE 1 and showing the construction of the movable contact assembly.
FIGURE 3 is a vertical section taken along the line 3—3 of FIGURE 1 and showing the construction of the sweep contact assembly; and, FIGURE 4 is a vertical section taken along the line 4—4 of FIGURE 1 and showing the construction of the reference contact assembly.

Referring to FIGURE 1, there is shown a contact assembly constructed in accordance with this invention and installed in a telemetering system disclosed in copending application of Robert H. Kolb, entitled "Remote Telemetering and Recording System," Serial No. 715,893, filed February 18, 1958, now Patent No. 3,007,134. In the contact assembly illustrated 10 is the input shaft for the information being telemetered. More particularly, the angular position of the input shaft 10 with reference to the position of the reference contact 12 is telemetered. In the above-referenced copending application, the input shaft 10 is positioned by a Bourdon tube type pressure gage. The input shaft is provided with a movable contact assembly 11 while a sweep contact assembly 13 is disposed to rotate in a path that includes both the reference contact 12 and the movable contact 11. The sweep contact is driven by a synchronous drive motor 14 that includes a suitable gear reduction. While the above copending patent application shows the use of a synchronous motor for driving the sweep contact in order that the position of the sweep contact will remain synchronized with a pulse producing apparatus located at the surface of the well, obviously other drive means may be used. For example, in a copending application of Robert H. Kolb, entitled "Telemetering System for Wells," Serial No. 786,470, filed January 13, 1959, and now abandoned, there is shown and described a system in which a non-synchronous motor is used to drive both the sweep contact and pulse producing means and then only the pulses are telemetered to the remote location or the surface of the well.

The upper end of the input shaft 10 is provided with a pivot point 15 that rests in a pivot bearing 16 carried in a cup-shaped recess 35 formed on the end of the sweep shaft 20. The input shaft 10 is provided with a journal bearing at its lower end (not shown) and an axial load which centers the pivot point 15 in the pivot bearing 16. The axial load is obtained by slightly compressing the helical Bourdon tube which positions the shaft 10. The use of a pivot bearing 16 insures that the contact assembly 11 and sweep contact 13 rotate about a common axis while applying a minimum friction load on the shaft 10.

Referring to FIGURE 2, the movable contact assembly 11 consists of a contact plate 22 which is clamped to the pivot point 15 by means of a cap screw 24. An insulating bushing 21 is disposed between the contact plate and the pivot point to insulate the contact plate from the pivot point and input shaft 10. The contact consists of a retractable or sliding contact 27 that is disposed for sliding movement in a passageway 25 formed in the end of a contact plate 22. The sliding contact 27 is preferably a cylindrical element which is disposed with its longitudinal axis at an angle to the tangent of rotation of the sweep contact 13. The passageway 25 is provided with a partially closed end 26 that forms a stop for the end of the sliding contact 27. The sliding contact 27 is urged into engagement with the end of the passageway 25 by means of a contact spring 28 (omitted in FIGURE 1 for the purpose of clarity). When the end of the contact 27 engages the end of the passageway 25 a portion of the end of contact 27 is exposed beyond the outer surface of the contact plate 22. The contact spring 28 is a circular type spring which is provided with hook shaped ends that engage an opening 29 formed in the end of the sliding contact 27 and an opening 30 formed in the contact plate 22. The contact spring 28 in addition, prevents the contact 27 from rotating, thus insuring the accuracy of any subsequent calibration even though the contact 27 has a warm spot. The electrical lead for the movable contact assembly 11 is coupled to the contact plate by means of a hair spring 32, one end of which is secured to anchor post 31. The opposite end of the hair spring is coupled to an electrical conductor or lead 33. The use of a hair spring provides a simple means for connecting the electrical conductor 33 to the contact assembly while introducing a repeatable torque on the assembly. The hair spring 32 is located in an insulated housing 34 which is fastened to the end of the Bourbon tube housing.

The sweep shaft 20 is journalled in two ball bearings 36 and 37 which are mounted in a bearing housing 40 disposed in the outer housing of the contact assembly. The outer race of the bearing 36 engages a shoulder 39 formed on the bearing housing while the inner race of the bearing 37 engages a snap ring 41 positioned around the shaft 20. The inner race of the bearing 36 engages a shoulder 38 formed on the end of the shaft 20. The bearings are spring loaded by means of a compression spring 42 that engages followers 43 and 44. The follower 43 is disposed to engage the outer race of the bearing 37 while follower 44 engages a washer 45 that rests against a tapered shoulder formed on the bearing housing 40. Thus, the spring tends to move the bearing 37 upward as shown in FIGURE 1 and insures sufficient axial loading to remove all radial and end play from the bearing 36 and 37. Washer 45 also serves to provide a friction load for shaft 20 to eliminate backlash thereupon. In order to supply this load, washer 45 should be formed from a deformable plastic material that will grip the shaft 20 to supply a friction load when deformed by the force of spring 42 against the tapered shoulder. To provide the required friction the washer 45 is initially a push fit on the shaft 20.

The construction of the sweep contact is best seen in FIGURE 3. The sweep contact consists of an arm member 50 which is locked to the outer surface of the cup-shaped end 35 on the shaft 20 by means of a cap screw 51. The cap screw 51, in addition to locking the arm 50 to the shaft 20, also secures a rod-shaped contact member 52 in the outer end of a slat formed in the arm member 50. Contact 52 should project axially on opposite sides of the arm as shown in FIGURE 1 in order that it may contact both the movable and reference contacts.

The construction of the reference contact assembly 12 is substantially identical to the construction of the movable contact assembly 11 described above. This construction is shown in FIGURE 4 in which the contact plate 54 is secured to a projection 53 formed on the bearing housing 40 by means of a cap screw 56. An insulating washer is disposed between the contact plate and bearing housing to insulate the contact plate from the bearing housing 40. The reference contact assembly consists of a retractable or sliding contact 57 which is urged into engagement with a stop 59 formed in the passageway 58 by means of spring 60 (omitted in FIGURE 1 for the purpose of clarity). An electrical lead 61 is connected directly to the contact plate 54.

The contact assembly is completed by coupling the sweep shaft 20 to the synchronous motor by means of a constant velocity coupling 46. In addition to having a constant velocity the coupling 46 should have a zero backlash to insure that no lost motion is introduced into the contact assembly.

From the above description, it is seen that a contact assembly has been provided in which the movable and reference contacts are formed by sliding contacts which are returned to a fixed position by means of biasing springs. Thus, the flat end of the sliding contacts 27 and 57 will always be returned to a fixed position in which a portion of the end is exposed. The sweep contact consists of a rod member 52 which will engage the exposed flat end of the sliding contacts 27 and 57 in substantially a straight line. The sweep contact will then displace or force the sliding contacts 27 and 57 to retract into the passageway in opposition to the force of the spring and permit the sweep contact to pass over these contacts with a wiping action. This wiping action will insure that the electrical connection between the contacts is broken at a different position than where it was made thus insuring that any arcing will occur at a different part of the contact than where contact is initially made. Furthermore, since the sliding contacts 27 and 57 are returned to a fixed position the points of contact between the sweep contact and the movable and reference contacts will be accurately reproduced. The angular displacement between the position where the sweep contact makes contact with the movable contact and the position where it makes contact with the reference contact will be substantially constant during succeeding revolutions providing, of course, that the position of the movable contact does not change during the succeeding revolutions of the sweep contact. The accuracy of the contact assembly is further increased by insuring that all of the bearings have zero radial play by loading them in an axial direction. This is achieved by providing a spring loaded pivot bearing for supporting the upper end of the shaft 10 by applying an axial spring load to the shaft 10. To insure a minimum of lost motion or backlash in the contact assembly, deformable washer 45 is used to supply a friction load to the shaft 20. This load is achieved by utilizing the reaction of the spring 42 to deform washer 45, thus forcing it into frictional engagement with shaft 20. While some friction load is desirable for the shaft 20, it should not be so large as to cause an undue increase in the power required for driving the shaft 20. A suitable material for forming the washer 45 is a fluorated ethylene polymer plastic material commonly sold under the tradename of "Teflon."

Of course, the position of the reference contact assembly 12 must be adjusted to align with the zero or some other position of the measuring devices coupled to the input shaft 10. This adjustment may be readily accomplished by loosening the cap screw 56 on the contact assembly 12 and rotating the contact plate 54 on the projection 53. This adjustment could also be made by rotating the contact plate 22 of the movable contact to position the movable contact properly with respect to the reference contact.

While the above description of a preferred embodiment is directed to the use of the contact assembly in a telemetering system using a rotational input shaft it can also be used to telemeter the angular position about a sweep axis of any object. Accordingly, this invention should not be limited to the details described but only to its broad spirit and scope.

I claim as my invention:

1. In a contact assembly having a reference contact and a movable contact disposed in a path traversed by a sweep contact, said assembly comprising:

a shaft disposed to rotate about a central axis;

first and second contact plates disposed in a spaced relation along said central axis and surrounding said shaft, said first contact plate being fixed and said second contact plate being disposed to rotate about said central axis;

a rod shaped reference contact slidably mounted on said first contact plate, the axis of said reference contact being spaced from and in a plane at right angles to said central axis;

a rod shaped movable contact slidably mounted on said second contact plate, the axis of said movable contact being spaced from and in a plane at right angles to said central axis;

separate biasing means for said reference and movable contacts, said biasing means urging said reference and movable contacts to fixed positions in which at least a portion of one end of each contact is exposed;

a sweep contact mounted on said shaft, said sweep contact having a cylindrical member disposed with its axis parallel to and radially spaced from said central axis to contact the exposed ends of the referenced and movable contacts when said shaft rotates.

2. In the contact assembly of claim 1 wherein the rod shaped reference and movable contacts are mounted with axis of the rod shaped contact at an angle to the tangent of a circle that passes through the exposed surface of the contact members, the center of said circle coinciding with said contact axis.

3. In the contact assembly of claim 1 wherein the exposed end of each of the contacts is flat and at right angles to the axis of the contact.

4. In the contact assembly of claim 1 wherein a pivot bearing is disposed on said shaft and said movable contact is mounted on a second shaft, one end of said second shaft being supported by said pivot bearing and means for applying an axial load to the second shaft to force said one end of said second shaft into engagement with said pivot bearing.

5. The contact assembly of claim 3 wherein a radial arm is secured to said shaft and said sweep contact is mounted on said radial arm.

6. In a contact assembly having a reference contact and a movable contact disposed in a path traversed by a sweep contact, said assembly comprising:

a first shaft, a pair of ball bearings disposed to support said first shaft for rotation about a central axis;

first and second contact plates disposed in a spaced relation along said central axis and surrounding said first shaft, said first contact plate being fixed and said second contact plate being disposed to rotate about said central axis;

a rod shaped reference contact slidably mounted on said first contact plate, the axis of said reference contact being spaced from and in a plane at right angles to said central axis;

a rod shaped movable contact slidably mounted on said second contact plate, the axis of said movable contact being spaced from and in a plane at right angles to said central axis;

separate biasing means for said reference and movable contacts, said biasing means urging said reference and movable contacts to fixed positions in which at least a portion of one end of each contact is exposed;

a pivot bearing mounted on said shaft and aligned with said central axis;

a second shaft, said second contact plate being mounted on said second shaft, one end of said second shaft being supported in said pivot bearing;

a first biasing means for axially loading said first shaft in one direction, a second biasing means for axially loading said second shaft in said one direction;

and an elongated sweep contact mounted on said shaft with its axis parallel with and radial from said central axis to contact the exposed ends of said reference and movable contacts.

References Cited in the file of this patent

UNITED STATES PATENTS

| | | |
|---|---|---|
| 2,203,784 | Holthouse | June 11, 1940 |
| 2,623,936 | Kennedy et al. | Dec. 30, 1952 |
| 2,734,188 | Jacobs | Feb. 7, 1956 |
| 2,769,041 | Werner et al. | Oct. 30, 1956 |
| 3,007,134 | Kolb | Oct. 31, 1961 |